United States Patent [19]

Garton

[11] Patent Number: 4,982,523

[45] Date of Patent: Jan. 8, 1991

[54] SPEAR-HEAD AND SHANK ASSEMBLY FOR SPEARFISHING

[76] Inventor: John B. Garton, R. R. #2, Jasper, Canada

[21] Appl. No.: 443,323

[22] Filed: Nov. 30, 1989

[51] Int. Cl.$^5$ ............................................. A01K 81/00
[52] U.S. Cl. .......................................................... 43/6
[58] Field of Search ................. 43/6; 294/61, 126, 130

[56] References Cited

U.S. PATENT DOCUMENTS

| | | | |
|---|---|---|---|
| 1,344,693 | 6/1920 | Hinsdale | 43/6 |
| 2,646,048 | 3/1953 | Marcus | 43/6 |
| 2,859,970 | 6/1956 | Doanan | 43/6 |
| 3,036,395 | 5/1967 | Nelson | 43/6 |
| 3,036,396 | 5/1962 | Swails | 43/6 |
| 3,138,383 | 6/1984 | McKinzie | 43/6 |
| 3,766,678 | 10/1973 | Reaves | 43/6 |

FOREIGN PATENT DOCUMENTS 407846  3/1934  United Kingdom ..................... 43/6

Primary Examiner—Richard K. Seidel
Assistant Examiner—Chuck Y. Mah
Attorney, Agent, or Firm—Charles S. McGuire

[57] ABSTRACT

A novel spear-head and shank assembly for spearfishing small fish with a speargun or compound flashing bow wherein the spear-head is pivotally mounted to the shank. Cooperative engagement means on the proximal end of the spear-head and the distal end of the shank enables the spear-head to automatically release from a normal, striking position upon striking a fish and gathering in a cable attached to the spear such that the spear-head will pivot to assume a position which prevents the fish from withdrawing from the spear prematurely. The spear-head may be manually pivoted to a release position wherein the fish may be easily removed from the spear, and then back to its normal, striking position.

7 Claims, 2 Drawing Sheets

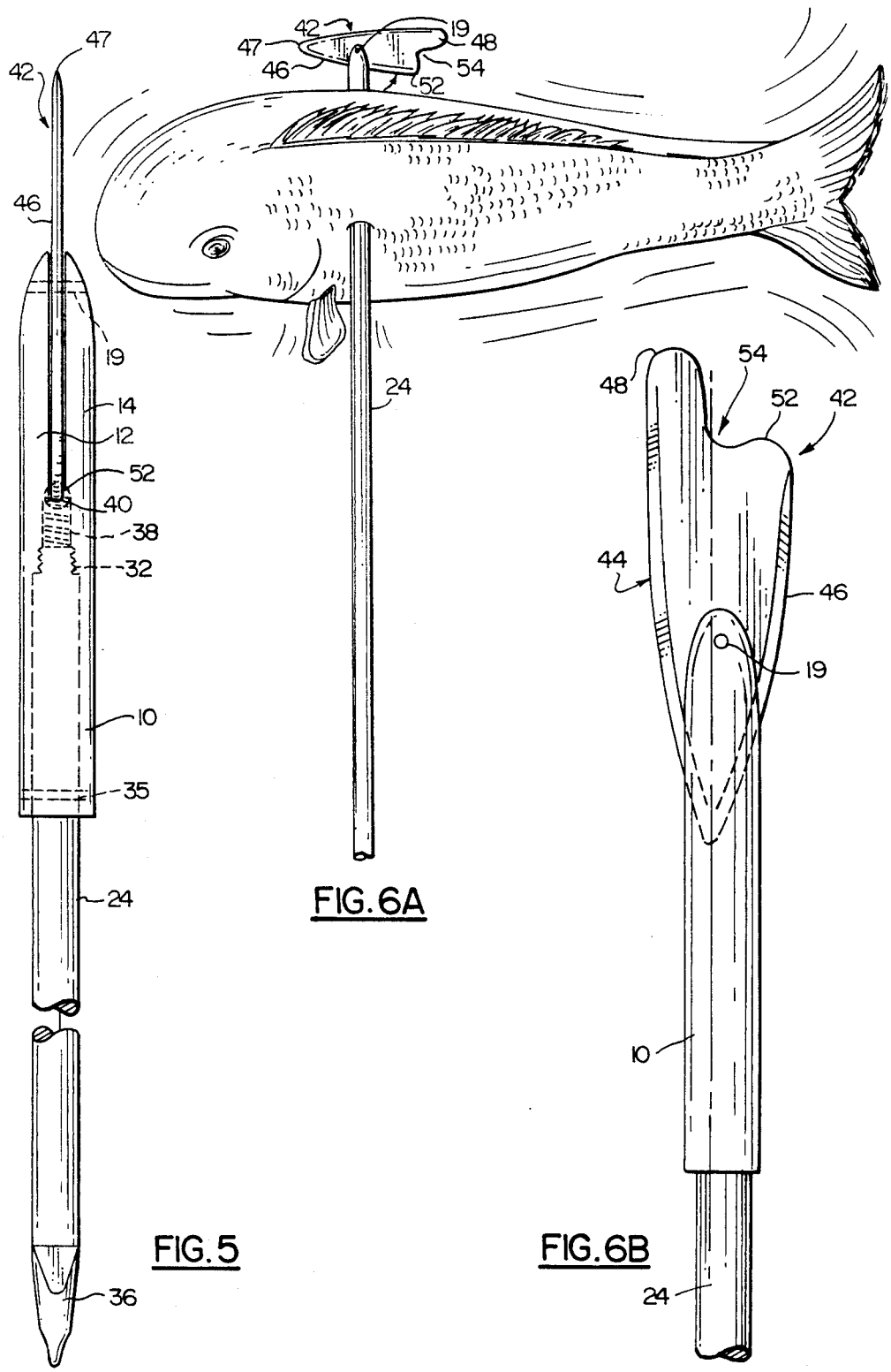

SPEAR-HEAD AND SHANK ASSEMBLY FOR SPEARFISHING

BACKGROUND OF THE INVENTION

This invention relates to fishing spears and, more particularly, to a novel spear-head and shank assembly for use in spearfishing The sport of spearfishing is well known and the prior art is replete with different types of fishing spears. It is typical that the fish spear be attached to a line or cable such that once a fish has been speared, both the spear and the fish may be retrieved by gathering in the cable. During the retreival process, it is not unusual that the spear may become disengaged from the fish, in the absence of means to retain the speared fish on the spear to await manual removal of the spear from the fish. This is accomplished, in many of the apparatus, by a barb arrangement wherein the barbs are held within the spear-head in an unopen position, the barbs triggering into an open position upon impact. Examples of such fish spears can be seen in U.S. Pat. No. 3,036,396, issued to Swails on Aug. 31, 1959 (barbs 28, moveable by loaded spring 32) and U.S. Pat. No. 4,024,665, issued to Payne on May 24, 1977 (scissor-like blades 11 and 12, including barbs 22-29). Although the barb arrangements of Swails and Payne are manually retractable for easier removal of the fish from the spear, the barbs can cause significant tearing of the fish, especially if the portion of the spear containing the barbs does not completely exit through to the other side of the target.

It is a principal object of the present invention to provide a barbless spear assembly meant for spearing fish of relatively small size such that, upon firing the spear upon a target, the spear-head of the invention will penetrate the body of the fish and exit through to the other side of the fish, the spear-head being pivotally attached to the shank and configured such that the spear-head will pivot from a normal, striking position to an engaged position upon pulling the spear toward one's self via an attached cable.

It is another object of the invention to provide a fish spear assembly which includes a smoothly contoured, pointed spear-head on its distal end which will easily penetrate a fish, including automatically actuable means preventing premature or unintended withdrawal of the spear after it has pass through a fish.

It is further object of the present invention to provide a fish spear including a spear-head which is pivotally moveable on the shank to prevent withdrawal of the spear, and is easily pivoted to a release position to allow simple and quick disengagement from the pierced target.

Other objects will in part be obvious and will in part appear hereinafter.

BRIEF SUMMARY OF THE INVENTION

For ease of description and orientation, the various elements of the invention will be referenced as having respective, proximal and distal portions.

The invention provides a barbless fish spear assembly for use with a spear-fishing gun or compound fishing bow, as desired, the spear assembly comprising a shank having a through axial bore adapted to receive a shaft within a proximal portion of its bore and a spring assembly within a distal portion of the bore. A cable is attached to a proximal portion of the shaft such that the spearman may manually retreive the fired spear by gathering the cable. The spear-head of the invention is pivotally attached in a slot between two parallel prongs which integrally and linearly extend from the distal end of the shank.

The substantially flat, two sided spear-head of the invention includes two blade edges which taper inwardly to form a sharp point at its distal end for piercing a fish. The blade edges begin to taper inwardly at different lengths along the spear-head toward its proximal end such that the edges form two, spaced-apart lobes including a concave recess therebetween. The concave recess of the spear-head engages with the spring assembly of the shank when the spear-head is pivotally secured into its normal, strike position.

The spring assembly comprises a ball-detent and screw with a spring disposed therebetween. The screw is threadably engaged within the axial bore of the shank and a distal end of the shaft is inserted into the bore at the proximal end of the shank such that its inserted, distal end bears against the screw disposed therein. The shaft is fixedly attached to the shank by a securing pin laterally extending therethrough.

When the spear-head is set in its normal, striking position, the concave recess at its proximal end engages with the ball detent at the distal end of the bore of the shank, thereby exerting a doward force on the spring toward its proximal end such that the spring compresses a predetermined amount. In this position, the ball detent and spring serve to keep the spear-head from pivoting about the axis of its attachment pin until a force of greater strength than the force of detention pushes upon the larger of the lobed extensions to allow the spear-head to pivot about the shank to release the spear-head from its normal position.

To spear a fish, the spearman loads the fishspear into a speargun or compound fishing bow as is used in this art, takes aim, and fires to strike a fish. In the strike position, the spear-head will pierce the body of the fish and exit through to the other side of the fish such that the shaft and shank extend through the body of the fish. When the cable is gathered to retreive the spear and fish, a force is exerted by the body of the fish against the proximal end of the large lobed extension of the spear-head. When the lateral component of this force overcomes the force exerted by the spring on the ball detent, the spear-head begins to pivot about its attachment pin until it assumes a position perpendicular to its normal position such that the short bladed edge of the spear-head is in substantial contact with the body of the fish. This is the "secured" position of the spear-head wherein its position prevents the fish from withdrawing from the spear. To remove the fish from the spear, the spearman must manually pivot the spear-head to reverse its original position. That is, its pointed end is directed back toward the side of the fish through which it has passed, within the slot of the shank created by the parallel prongs. In this "withdrawal" position, the lobed extensions form the distal portion of the spear-head, and the bladed edges of the spear-head taper outwardly toward such distal portion, thereby allowing easy removal of the fish. Once removed, the spear-head may be manually pivoted back to its normal, striking position.

BRIEF DESCRIPTION OF THE DRAWINGS

FIG. 5 is a front elevational view of the elements of FIG. 3;

FIG. 6A is a side elevational view of the shank and spear-head showing the spear-head pivoted to its engaged position; and FIG. 6B is a side elevational view showing the spear-head pivoted to its release, or withdrawal position.

DETAILED DESCRIPTION

Figure 1:
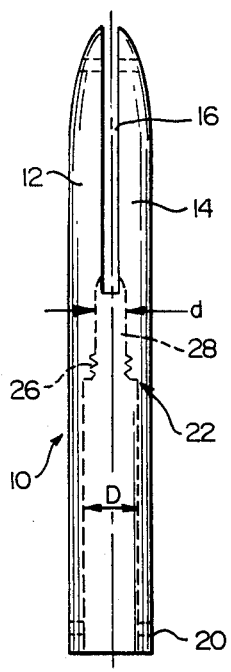
FIG. 1 is a front elevational view of the shank portion of the invention.
Figure 3:
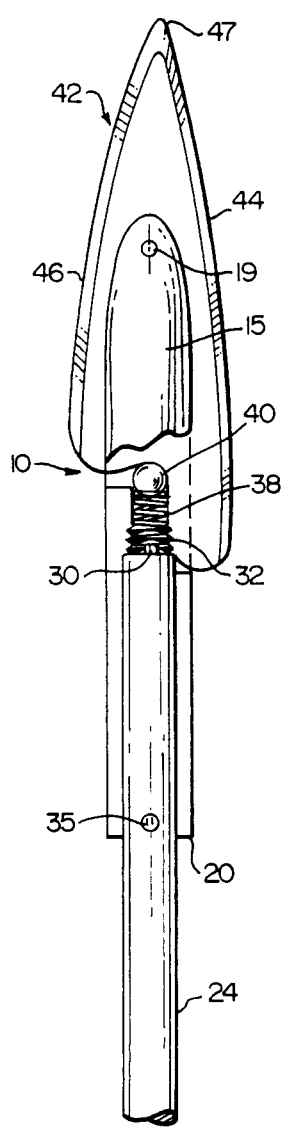
FIG. 3 is a side elevational view of the spear-head and shaft attached to the part of the shank shown in cross-section to reveal the shaft and spring assembly disposed within its internal bore.
Figure 3:
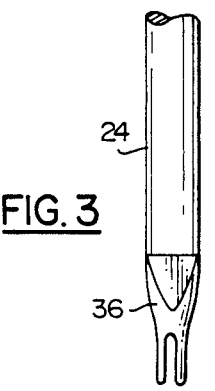

Referring now to the drawings, there is seen in FIG. 1 the shank portion 10 of the invention. Shank 10 includes parallel prongs 12 and 14, extending integrally and linearly from the distal end of shank 10 to form slot 16. Shank 10 also includes a through axial bore, including an internal diameter D extending from the proximal end 20 of shank 10 to a predetermined point 22 along the length of shank 10 to receive shaft 24, as seen in FIG. 3. As seen in FIG. 1, the internal axial bore of shank 10 also includes threaded bore portion 26 extending from point 22, threaded portion 26 being smaller in diameter than the proximal section of bore having diameter D. The internal bore of shank 10 extends from threaded portion 26 to the distal portion of shank 10 such that it communicates with slot 16, this section of bore being referenced by numeral 28 and of diameter d, smaller than diameter D yet larger than the width of slot 16.

Figure 4:
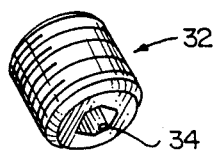
FIG. 4 is a perspective view of the screw shown in FIG. 3 showing the end which includes a recess to receive the bossed end of the shaft.

To assemble the spring assembly within shank 10, a ball detent 40 having a diameter slightly smaller than diameter d is placed within bore section 28 and, since slot 16 communicates with bore section 28 and is narrower than diameter d, ball 40 extends only a short distance upwardly into slot 16 from the bore of shank 10. With ball detent 40 in place, a spring 38 is placed within bore section 28 such that is proximal end contacts ball 40. Spring 38 and ball 40 are secured in position by a screw 32 being threaded into the proximal end of bore section 28. In particular, it can be seen in FIGS. 3 and 4 that shaft 24 includes boss 30 on its distal end for engagement with hexagonal recess 34 in one end of screw 32. To insert screw 32 and shaft 24 into shank 10, boss 30 is inserted in recess 34 and the distal end of shaft 24 is inserted into the bore at the proximal end 20 of shank 10 until screw 32 reaches the threaded portion 32 of the bore. Shaft 24 is then manually rotated to threadably engaged screw 32 into threaded bore portion 26 such that the distal end of screw 32 contacts the proximal end of spring 38. Shaft 24 is fixedly attached to shank 10 by a securing pin 35 extending laterally through shank 10 and shaft 24, near the proximal end 20 of shank 10. In the preferred embodiment, shaft 24 includes slotted, proximal end portion 36 such that the fishspear may be loaded into a conventional spear gun or compound fishing bow. A suitable length of flexible line or cable (not shown) is provided in conventional manner such that the fishspear may be retrieved after firing by manually gathering in the line.

Figure 2:
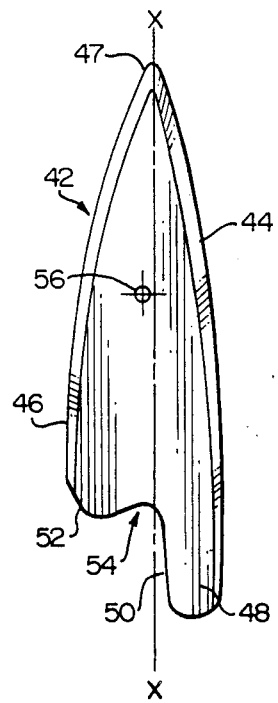
FIG. 2 is a side elevational view of the spear-head of the invention.

Substantially flat spear-head 42, as can be seen in FIG. 2, has a longitudinal axis x—x and includes relatively long and short blade edges 44 and 46, respectively, tapering inwardly about axis x—x toward its distal end, terminating at substantially a point 47. Long blade edge 44 extends from pointed end 47 to form lobed portion 48, having inner edge 50. Short blade edge 46 tapers inwardly at a shorter length than long blade edge 44 to form a curved portion 52 which meets inner edge 50 to form a concave recess 54 at the proximal end of spear-head 42 at axis x—x.

Spear-head 42 is placed in slot 16 and pivotally attached to shank 10 by a securing pin 19 laterally extending through prongs 12 and 14 and through hole 56 of spear-head 42, its point of attachment being such that curved portion 52 is moveable through slot 16 while lobe 48 is not. As can be seen in FIG. 2, hole 56 is positioned slightly off axis x—x of spear-head 42, in the preferred embodiment, about 1/16" off-center. That is, the pivot axis of spear-head 42 is positioned a short distance laterally of the axis through point 47 and detent recess 54, on the opposite side of the axis from lobed portion 48. This positioning of hole 56 prevents spear-head 42 from prematurely releasing from its normal position upon initial impact with a target, as explained more fully hereinafter.

In operation, spear-head 42 is manually pivoted and secured into its normal position wherein concave recess 54 of spear-head 42 contacts ball-detent 40 as seen in FIGS. 3 and 5. In this normal position, sping 38 is compressed within bore section 28 such that an opposite, upward force is exerted on ball-detent 40. Ball-detent 40 thereby exerts an upward force against concave recess 54 such that spear-head 42 will remain in this normal position until a downward force on ball-detent 40 of greater magnitude than the opposite, upward force is exerted to push ball-detent 40 down upon spring 38 to compress it within bore section 28. This occurs, for instance, when the spear is fired upon a fish such that spear-head 42 pierces the fish and exits completely through to the other side of the body of the fish and the attached line or cable is gathered to retreive the speared fish, causing the body of the fish to exert a force against the proximal end of lobe 48. This force exerted on lobe 48 has a component urging spear-head 42 toward counter-clockwise rotation (as seen in FIGS. 3 and 5). When the magnitude of this force component exceeds the detent force tending to prevent such rotation, the edge of curved portion 52 rides over ball 40, moving spear-head 42 into its "secured" position, i.e., spear-head 42 will pivot about securing pin 19 until axis x—x of spear-head 42 is perpendicular to the longitudinal axis of shank 10 and shaft 24, as can be seen in FIG. 6A. In this way, the spear cannot be prematurely withdrawn from the fish without exerting a force against lobe 48, which will pivot spear-head 42 into the secured position of FIG. 6A.

To remove the fish, spear-head 42 may be manually pivoted, in a counter-clock-wise direction from the engaged position of FIG. 6A to the withdrawal position of FIG. 6B, wherein point 47 is moveable in slot 16 of shank 10. In this withdrawal position, the spearman may easily slide the fish off shank 10 and spear-head 42. Spear-head 42 may then be manually pivoted back to the normal, striking position of FIGS. 3 and 5.

What is claimed is:
1. A fishspear assembly comprising:
  a. an elongated shank having a first longitudinal axis with proximal and distal ends;

b. a substantially flat spear-head having a second longitudinal axis extending between proximal and distal ends, said spear-head proximal end having a maximum width larger than the maximum width of said shank distal end, said spearhead including two blade edges which taper inwardly about said longitudinal axis to form substantially a point at said distal end;

c. two parallel prongs spaced apart a predetermined distance, said prongs integrally and linearly extending from said distal end of said shank such that a slot is formed between said prongs;

d. an axial bore within a distal portion of said shank and in communication with said slot, said bore having a predetermined diameter larger than said predetermined distance;

e. a spring having proximal and distal ends and placed within said bore of said shank;

f. a ball-detent having substantially the same diameter as said predetermined diameter of said bore, said ball-detent placed within said axial bore of said shank such that said ball is in contact with said distal end of said spring and compresses said spring within said bore a predetermined amount, a portion of said ball extending upwardly within said slot between said prongs; and g. a curved recess at the proximal end of said spear-head, said recess in substantial contact with said ball-detent when said spear-head is in said engaged position whereby said spring and said ball-detent exert a force of detention upon said spear-head, said force tending to prevent said spear-head from pivoting about its pivot axis within said slot.

2. The invention according to claim 1 wherein said two blade edges of said spear-head taper inwardly at different lengths along said spear-head toward its proximal end such that the longer of said blade edges forms a lobed portion having an inner edge and the shorter of said blade edges forms a curved edge which meets with said inner edge of said lobed portion at the proximal end of said longitudinal axis of said spear-head wherein said curved recess is formed, said spear-head being pivotally attached to said prongs in said slot such that said curved edge and said point on said distal end may move freely within said slot while said lobed portion cannot move freely within said slot.

3. The invention according to claim 2 wherein said second longitudinal axis extends through said point and said curved recess, and said pivot axis of said spear-head is positioned a predetermined distance laterally of said second longitudinal axis on the opposite side of said longitudinal axis from said lobed portion.

4. The invention according to claim 3 wherein said predetermined distance is about 1/16 of an inch.

5. The invention according to claim 1 wherein said axial bore of said shank extends through to the proximal end of said shank, a proximal portion of said bore being adapted to receive a shaft.

6. The invention according to claim 5 and further including a screw having a recess on one end for receiving a boss on the distal end of said shaft, whereby said screw may be mounted upon said shaft and said shaft manually inserted into the proximal end of said bore of said shank and manually rotated such that said screw becomes threadedly engaged within said bore with the distal end of said screw in contact with the proximal end of said spring.

7. The invention according to claim 6 wherein said shaft includes a slotted, proximal end for engagement with a conventional speargun or compound fishing bow.

* * * * *